Figure 2:
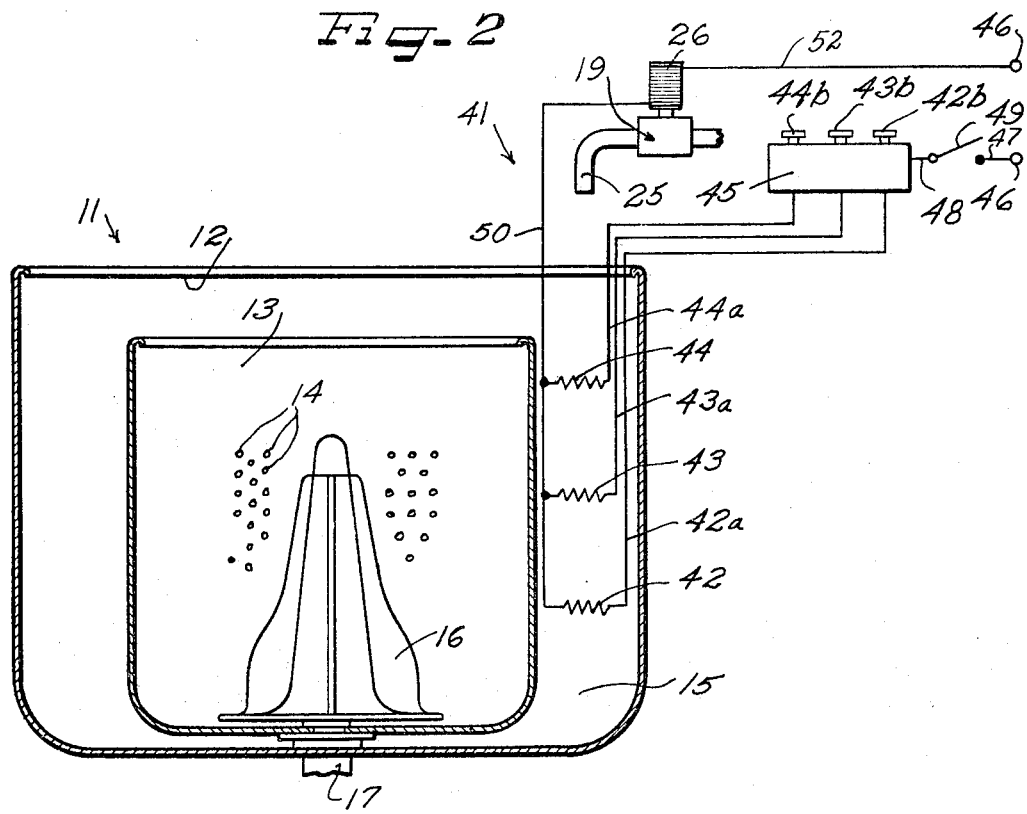

Nov. 15, 1966 R. W. COUFFER, JR., ET AL 3,285,275
LIQUID LEVEL DETECTOR
Filed Jan. 15, 1964 2 Sheets-Sheet 1
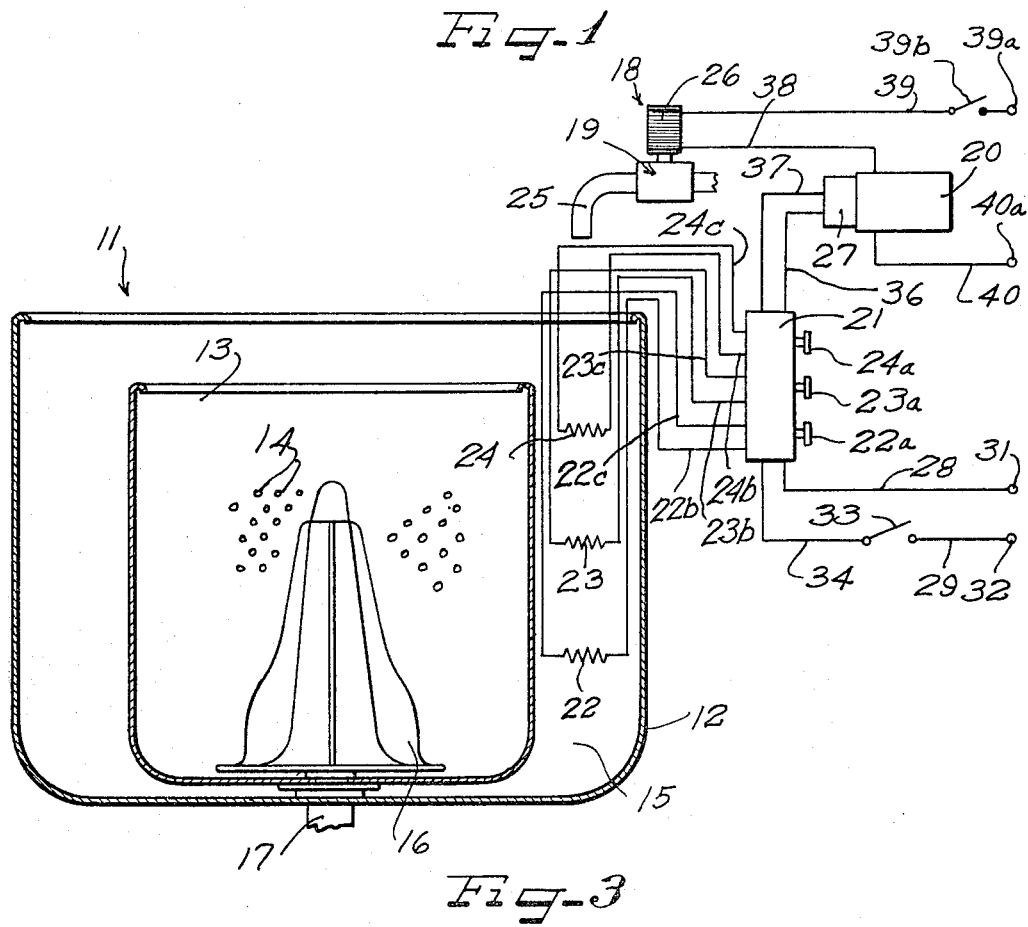
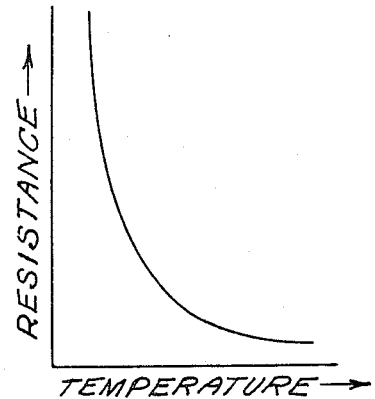
INVENTORS
Robert W. Couffer, Jr.
BY Joseph M. Algino
ATTORNEYS United States Patent Office 3,285,275
Patented Nov. 15, 1966

3,285,275
LIQUID LEVEL DETECTOR
Robert W. Couffer, Jr., Deerfield, and Joseph M. Algino, Chicago, Ill., assignors to The Dale Valve Company, Morton Grove, Ill., a corporation of Illinois
Filed Jan. 15, 1964, Ser. No. 337,929
5 Claims. (Cl. 137—392)

This invention generally relates to a liquid level control system and more particularly relates to a thermistor liquid level control system.

Liquid level control systems of present day laundry apparatus are controlled by a mechanical shutoff mechanism such as a float arrangement and by a timing mechanism which may be utilized to energize and deenergize the solenoid mixing valve. These washing machines, however, would provide only two liquid levels because both of these systems presented various problems. The mechanical shutoff mechanisms are cumbersome and relatively expensive, while the timer level control system presented problems in accurate level control. The timer control mechanism is not accurate because the water supply pressure varies and thus the volume of water flowing into the tub is not constant for any unit of time. Therefore, when utilizing a timer level control system, the liquid level in the tub would vary in accordance to the pressure of the liquid supply.

The present invention overcomes the detrimental aspects of the prior art liquid level control systems by accurately sensing the liquid level and energizing and deenergizing the solenoid mixing valve to open and close said solenoid mixing valve.

Therefore, it is an object of the present invention to provide an electrical system that will allow the selection of a plurality of liquid levels.

It is another object of the present invention to provide a thermistor liquid level control system that will allow a plurality of selective liquid levels.

It is another object of the present invention to provide a thermistor liquid level control system that will provide for the selection of at least three liquid levels.

It is another object of the present invention to provide a washing machine with a plurality of thermistors therein that are located at different levels and said thermistors being connected to the solenoid of the solenoid mixing valve and to a level selector wherein the thermistors will open and close the solenoid mixing valve in accordance to the liquid level selected.

It is another object of the present invention to provide a plurality of thermistors in a washing machine located at different levels wherein each thermistor is connected to a selector and the selector is connected to a timer which in turn is connected to the solenoid of a solenoid mixing valve wherein the selection of a particular thermistor will permit energization and deenergization of the solenoid through the timer as desired.

It is another object of the present invention to provide a laundry apparatus with at least three thermistors operatively connected to a liquid level selector and the solenoid of a solenoid mixing valve wherein the solenoid will be energized to allow liquid to flow into the laundry tub and deenergized by one of the thermistors when the liquid is at a predetermined selected level.

Other objects and features and advantages of the present invention will become apparent to those skilled in the art after a careful consideration of the following detailed description when considered in conjunction with the accompanying drawings wherein like reference numerals and characters refer to like and corresponding parts throughout the several views.

Figure 4:
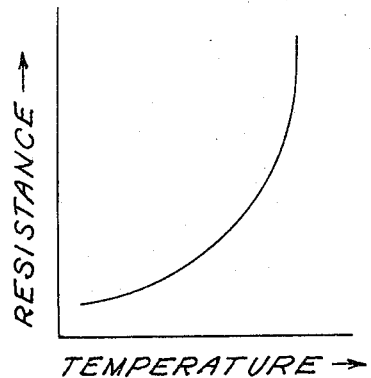

In the drawings:

FIGURE 1 is a partial longitudinal cross-sectional view with parts in elevation of a washing machine and has schematically illustrated therewith the liquid level control system constructed in accordance with the principles of the present invention;

FIGURE 2 schematically illustrates another liquid level control system constructed in accordance with the principles of the present invention in combination with a washing machine which is illustrated in a partial longitudinal cross-section with parts in elevation;

FIGURE 3 is a chart illustrating the temperature-resistance characteristic of a thermistor utilized in the present invention; and FIGURE 4 is another chart illustrating the temperature-resistance characteristic of another thermistor utilized in the present invention.

As shown in the drawings:

A washing machine utilizing the liquid control system of the present invention has an inner perforated washing tub with an oscillating washing vane therein and a concentric imperforate outer tub. A plurality of thermistors are attached to the outer tub and are located at different levels therein. Each thermistor is connected to the solenoid of the solenoid mixing valve and to a selector. The selector is suitably connected to a current supply mechanism whereby when a proper thermistor is selected the current will pass therethrough to energize the solenoid to allow liquid to flow through the mixing valve and into the washing machine. When the current conducting thermistor is covered by the liquid in the outer washing tub the thermistor will cause the solenoid to be deenergized to stop the flow of liquid through the mixing valve, and thus setting the liquid at a predetermined level.

Referring to FIGURE 1 there is illustrated a washing machine 11 having an outer cylindrical imperforate tub 12 and an inner concentric tub 13 having a plurality of ports 14 therethrough. The tubs 12 and 13 form an annular liquid chamber 15. Within the tub 14 is connected an agitating vane 16 which is oscillated through appropriate means attached to the vane shaft 17.

Connected to the tub 11 is a liquid level control system 18 comprising a solenoid mixing valve 19, a timer 20, a selector 21 and a plurality of thermistors 22, 23 and 24.

The solenoid mixing valve 19 is suitably connected to the hot and cold water faucet and has a spout 25 which delivers water into the annular chamber 15 and a solenoid 26 which opens and closes the mixing valve 19. The timer 20 has a normally closed switch and timer motor 27 which opens and closes the switch within the timer 20. The selector 21 has three switches 22a, 23a and 24a and the selectors are each operatively connected to the respective thermistors 22, 23 and 24.

A pair of electrical lines 28 and 29 are connected at their ends to suitable terminals 31 and 32. The electrical line 29 has connected thereto an on-off switch 33 that makes and breaks electrical contact between the line 29 and a line 34. The electrical line 28 leads into and through the selector 21 and is connected to an electrical line 36 which interconnects the selector 21 and the timer motor 27. The electrical line 34 is connected to the electrical lines 22b, 23b and 24b which are respectively connected to one end of the thermistors 22, 23 and 24. The other ends of the thermistors are connected by electrical lines 22c, 23c and 24c, which are respectively connected within the selector 21 to the selector switches 22a, 23a and 24a respectively. An electrical line 37 interconnects the selector 21 with the timer motor 27. The selector switches 22a, 23a and 24a will each open and close contact between the line 37 and one of the respective thermistor lines 22c, 23c, or 24c. To make a complete electrical circuit with any particular thermistor, a selector switch is depressed, for example selector switch 22a, and electrical contact is made between the thermistor line 22c and the timer motor line 37.

The timer switch has a suitable electrical line 38 connected to the solenoid 26 which has a suitable line 39 leading therefrom and connected to a terminal 39a and an electrical line 40 connected to the terminal 40a. The line 39 has a switch 39b therein.

The thermistors 22, 23 and 24 as illustrated in the present embodiment are preferably positive thermistors wherein the resistance of the thermistor decreases as the temperature decreases as is illustrated by the graph of FIGURE 4.

In operation, the mixing valve may be manually opened or opened by closing the switch 39b to make electrical contact between the lines 38 and 39 through the normally closed timer switch and thus energize the solenoid 26. Energization of the solenoid 26 opens the mixing valve 19 to allow liquid to flow through the spout 25. One of the selector switches, in accordance to the level of liquid desired, for instance selective switch 22a is depressed and switch 33 is closed. The depression of selector switch 22a makes a complete circuit between the lines 28, 36 and the lines 29, 34, 22b, 22c and 37. The current through the thermistor 22 causes the thermistor to heatup and thus maintain a high resistance to prevent sufficient supply of current to operate the timer motor. As the water rises in the chamber 15 it will come in contact with the thermistor 22. When the water contacts the thermistor 22 it will cool the thermistor and thereby decrease the resistance thereof. By decreasing the resistance, the current supply to the line 37 through the line 22c is increased sufficiently to operate the timer motor 27. The timer motor then turns an appropriate cam means therein to open its switch to break contact between lines 38 and 40, to deenergize the solenoid 26. When the solenoid 26 is deenergized, the mixing valve 19 is closed and water stops flowing through the spout 25. When the mixing valve 19 is closed, the timer may then actuate the control mechanism (not shown which activates the wash cycle of the washing machine.

Referring to FIGURE 2 there is illustrated another liquid level control system constructed in accordance to the principles of the present invention.

The washing tub 11 has mounted therein a liquid level control system 41 having a plurality of thermistors 42, 43 and 44 connected to the annular liquid chamber 15. Connected to one end of each thermistor are lines 42a, 43a and 44a which lead into a selector 45 having selector switches 42b, 43b and 44b. A terminal 46 is connected through lines 47 and 48 to the selector 45. Between lines 47 and 48 is a switch 49. The line 48 is connected in series with the switches 42b, 43b and 44b. The switches 42b, 43b and 44b are such that each makes physical contact with one of the respective lines 42a, 43a and 44a when one of the switches is depressed.

The other ends of each thermistor is connected in series to lead line 50 which leads into the mixing valve solenoid 26. The other end of the solenoid head is connected to a terminal 46 by line 52. The thermistors 42, 43 and 44 are negative thermistors, wherein the resistance decreases as the temperature increases as illustrated by the grap of FIGURE 3. A particular liquid level is selected by depressing one of the selector switches, for instance selector switch 43b. When selector switch 43b is depressed, current flows through the line 43a into the thermistor 43 and into the solenoid 26 to energize the solenoid. The current passing through the line 43a heats the negative thermistor 43 to maintain a low resistance therein and allow a sufficiently large amount of current to flow into the solenoid 26 to energize the solenoid 26. When the solenoid 26 is energized, it opens the mixing valve 19 to allow water to flow through the spout 25 and into the chamber 15. As the water level increases in the chamber 15 it finally contacts the thermistor 43 to cool the thermistor 43. Upon cooling the resistance of the thermistor is increased to prevent sufficient current to flow through line 50 into the solenoid 26 to maintain the energization of the solenoid 26. Thus the solenoid is deenergized and the mixing valve closed to stop the flow of water through the spout 25 and the level of the water in the washing machine is as was predetermined by the selection made through the selector 45. It is of course understood that when either selector switch 42b or 44b is depressed, it operates to control the liquid level by their respective thermistors 42 and 44c in the same manner as selector switch 43b.

It is of course understood that the thermistors in the above embodiments were positive and negative thermistors for illustrative purposes only and that for instance a negative thermistor may be used in the embodiment of FIGURE 1 by using a timer which has a normally open switch that will be closed by actuation of the timer motor and a positive thermistor may be used in the embodiment of FIGURE 2 by using a solenoid mixing valve which is closed upon energization of the solenoid.

It is of course understood that the above embodiments are for illustrative purposes only and that modifications and variations in the present invention may be effected without departing from the spirit and scope of the present invention. Therefore, it is understood that the scope of our invention is set forth in the herein appended claims.

We claim as our invention:

1. A washing machine in combination with a thermistor water level control system for detecting and controlling water level in a water chamber comprising:
   a plurality of negative thermistors mounted at different levels within a water chamber in the washing machine,
   a selector having a plurality of switches,
   each selector switch being connected to one thermistor and being normally open,
   a normally closed mixing valve connected to a water supply and adapted to supply water to the washing machine water chamber,
   a solenoid to open and close said mixing valve,
   said solenoid being connected to the thermistors,
   means to supply power to the thermistors through the selector switches.
   an electric circuit including one only of said thermistors as selected by the said selector to transmit current to the said solenoid as a function of ambient temperature of the said selected thermistor
whereby a decrease in ambient temperature of the selected thermistor, which occurs when the water within the water chamber attains such a level as to surround the said selected thermistor, results in decreased current flow in the circuit causing the normally closed mixing valve to shut off the water supply to the water chamber.

2. A washing machine in combination with a thermistor water level control system for detecting and controlling water level within a water chamber comprising:
   a plurality of thermistors characterized as having positive temperature coefficient of resistance mounted at different levels within a water chamber in the washing machine,
   a selector having a plurality of switches,
   each selector switch being normally open,
   means to actuate each selector switch to make contact with one only of thermistors,
   a normally closed timer switch,
   a timer motor connected to the timer switch and adapted to open said timer switch,
   means connecting each thermistor to the timer motor to actuate the timer motor,
   the thermistors and said timer motor being connected to a timer motor power supply,
   a normally closed mixing valve connected to a water supply and adapted to supply water to the washing machine water chamber, a solenoid to open and close said mixing valve, a first electric circuit including one only of said thermistors as selected by the said selector to transmit current to the said timer motor as a function of ambient temperature of the said selected thermistor, and a second electric circuit including the said timer switch to transmit current to the said solenoid in response to current flow in said first circuit whereby a decrease in ambient temperature of the selected thermistor, which occurs when the water attains such a level in the water chamber as to surround the thermistor, results in an increased current flow in the first circuit, actuating the timer switch which opens the second circuit causing the normally closed mixing valve to shut off the water supply to the water chamber.

3. An apparatus for sensing the level of liquid within a container and actuating an electrically actuable device as a function of that level comprising:

a plurality of liquid level sensing elements characterized as having electric resistivity which varies with temperature, and positioned at different levels within the said container, an electrically actuable device, selector means for connecting in circuit with said electrically actuable device only one of the said elements, an electric power source electrically connected to the said selector means and the electrically actuable device, said electric actuable device having as its sole power input the electric current passing through the said one only of the said elements, and means for connecting the said elements in parallel relation to each other to the selector means.

4. An apparatus for detecting the level of liquid within a container comprising:

a liquid supply, an electric power source, a plurality of liquid level sensing elements characterized as having electric resistivity which varies with temperature, and positioned at different locations within the said container, an electromagnetic valve consisting of an energizable portion and valve portion connected to the said liquid supply, selector means for electrically connecting in circuit with the said energizable portion of the said electromagnetic valve one only of the said elements, means for electrically connecting the said elements in a parallel relation to each other to the said selector means, and an electric circuit including the said one only of said elements to transmit current to the said energizable portion of the said electromagnetic valve as a function of ambient temperature of said element, whereby changes in temperature of the selected element results in changed current flow to the electromagnetic valve.

5. An apparatus for detecting the level of liquid within a container comprising:

a liquid supply, an electric power source, a plurality of liquid level sensing elements characterized as having electric resistivity which varies with temperature, and positioned at different levels within the said container, an electric switch consisting of an energizable portion and switch portion, selector means for electrically connecting in communication with the said energizable portion of the said electric switch one only of the said liquid level sensing elements, an electromagnetic valve consisting of an energizable portion and a valve portion connected to the said liquid supply, a first electric circuit including one only of the said elements as selected by the said selector means for transmitting current as a function of ambient temperature of the said element to the energizable portion of the said electric switch, and a second electric circuit including the switch portion of the said electric switch for transmitting electric current to the said energizable portion of the electromagnetic valve in response to current flow in the said first circuit, whereby a change in the ambient temperature of the said selected element, which occurs when the liquid within the container attains such a level so as to surround the said selected element, results in a changed current flow in the first circuit actuating the electric switch causing a change in current flow in the second circuit which actuates the electromagnetic valve.

References Cited by the Examiner
UNITED STATES PATENTS

| | | | |
|---|---|---|---|
| 2,211,606 | 8/1940 | Pratt | 73—295 |
| 2,896,436 | 7/1959 | Buechler | 68—207 X |
| 3,078,874 | 2/1963 | Kolze | 137—607 |
| 3,181,557 | 5/1965 | Lannan | 137—392 X |

WILLIAM F. O'DEA, *Primary Examiner.*

MARTIN P. SCHWADRON, *Examiner.*

D. MATTHEWS, *Assistant Examiner.*